United States Patent
Cobb

(10) Patent No.: US 7,296,472 B2
(45) Date of Patent: Nov. 20, 2007

(54) METHOD AND APPARATUS FOR ACOUSTIC SENSING OF STRUCTURES

(75) Inventor: Wesley N. Cobb, Highlands Ranch, CO (US)

(73) Assignee: University of Denver, Denver, CO (US)

( * ) Notice: Subject to any disclaimer, the term of this patent is extended or adjusted under 35 U.S.C. 154(b) by 206 days.

(21) Appl. No.: 10/906,107

(22) Filed: Feb. 3, 2005

(65) Prior Publication Data

US 2005/0193818 A1 Sep. 8, 2005

Related U.S. Application Data

(60) Provisional application No. 60/541,352, filed on Feb. 3, 2004.

(51) Int. Cl.
*G01N 29/12* (2006.01)
*G01N 29/46* (2006.01)

(52) U.S. Cl. .................. 73/579; 73/602; 73/657; 73/659

(58) Field of Classification Search ............ 73/579, 73/597, 657, 660, 862.41, 862.59, 861.18, 73/602

See application file for complete search history.

(56) References Cited

U.S. PATENT DOCUMENTS

| 4,640,130 | A | | 2/1987 | Sheng et al. | |
|---|---|---|---|---|---|
| 4,811,595 | A | * | 3/1989 | Marciniak et al. | 73/149 |
| 5,203,209 | A | * | 4/1993 | Watkins et al. | 73/570.5 |
| 5,563,845 | A | | 10/1996 | Walsh | 367/7 |
| 5,673,050 | A | | 9/1997 | Moussally et al. | 342/22 |
| 5,824,892 | A | * | 10/1998 | Ishii | 73/149 |
| 6,055,214 | A | | 4/2000 | Wilk | 367/99 |
| 6,247,361 | B1 | * | 6/2001 | Bender et al. | 73/290 V |
| 6,307,475 | B1 | * | 10/2001 | Kelley | 340/573.1 |
| 6,801,131 | B2 | | 10/2004 | Donskoy et al. | |
| 6,822,929 | B1 | | 11/2004 | Schubert et al. | |
| 6,880,379 | B2 | | 4/2005 | Hedberg et al. | |
| 7,057,516 | B2 | | 6/2006 | Donskoy et al. | |
| 2006/0167595 | A1 | * | 7/2006 | Breed et al. | 701/1 |

FOREIGN PATENT DOCUMENTS

SU 652446 A * 3/1979

* cited by examiner

*Primary Examiner*—Hezron Williams
*Assistant Examiner*—Jacques M. Saint-Surin
(74) *Attorney, Agent, or Firm*—Christopher J. Kulish, Esq.; Kenneth C. Winterton, Esq.; Holland & Hart LLP

(57) ABSTRACT

A method and system provides for acoustic sensing of structures, including a general shape and/or configuration of the structure and movement within the structure. Acoustic waves are used to characterize structures, including any activity within. As waves from a sound source travel into the structure, they resonate within cavities and connecting tunnels or halls. This acoustic resonance is received at an acoustic receiver. The received signal is analyzed in comparison to the generated signal, and properties of the structure are determined, including the size and shape of the structure, as well as movement of objects within the structure.

21 Claims, 7 Drawing Sheets

METHOD AND APPARATUS FOR ACOUSTIC SENSING OF STRUCTURES

CROSS REFERENCE TO RELATED APPLICATIONS

The present application claims the benefit of U.S. Provisional Patent Application No. 60/541,352, filed on Feb. 3, 2004, and entitled "Active Acoustic Sensor of Underground Facilities," the entire disclosure of which is incorporated by reference herein.

FIELD OF THE INVENTION

The present invention relates to acoustic sensing for characterizing structures and the activity within structures. More specifically, the invention uses active acoustic signals and responses to the acoustic signals to determine the characteristics of and sense personnel movement within an underground facility or aboveground structure.

BACKGROUND

In present day police, military, and other intelligence and security operations, increasing numbers of operations are conducted that involve entering and securing above-ground or below-ground structures. Personnel involved with the tactical assessment of adversarial underground facilities and aboveground buildings are put at risk if an adversary is located within the structure. In such a case, a person entering the structure may be attacked by the adversary, or personnel in and/or around the structure may be subject to a surprise attack. Accordingly, operational planning involving such structures generally requires an abundance of caution in order to protect the involved personnel. Due to the many unknown risk factors involved, such planning and operations often proceed at a relatively slow pace. Once these facilities are identified, the ability to quickly and accurately assess the structures would improve operation planning and significantly lower the risks to soldiers and security personnel.

There has been a great deal of work done to detect and localize underground facilities, however, there are currently few sensing devices that can characterize these structures. Ground, air and space-borne sensors may locate underground facilities using passive acoustic (listening), infrared and other observables. Once located, tactical personnel must determine the threats posed by these facilities. Several sensors exist for locating personnel hidden within structures but most are impractical for use in caves and tunnels. Similarly, there are few devices that can identify potentially hostile movement within urban buildings. "Through the wall" radar is currently in routine use by law enforcement and border security personnel to detect subjects on the other side of building walls and some cargo containers. However, the range of detection is limited. Like most electromagnetic waves, radar is severely attenuated by rock/soil or metal walls and would not penetrate far into underground structures or buildings. Passive acoustic sensors have been developed to listen for nearby human activity (or heartbeats) within structures, and these may be very helpful in determining if humans are present in caves and tunnels. However, these sensors do not provide any information about the underground structure or location of activity deep inside a structure. In the case of underground facilities, military analysts have concluded that "the sheer complexity of underground facilities, including their location, depth, configuration, and military functions, suggest that this problem will plague U. S. defense planners for years to come". Thus, new sensing methods are needed for characterizing configuration and activity within tunnels and caves.

Similarly, homeland security and urban combat situations require sensors that detect activity within buildings and other structures. Law enforcement agencies, rescue teams and fire departments need better "see through the wall" technologies to locate people within these structures.

SUMMARY OF THE INVENTION

The present invention provides a method and system for utilizing acoustic waves to characterize structures and activity within structures. A source of acoustic waves is placed at or near an entrance to a structure and generates acoustic waves that enter the structure. The acoustic waves generate a resonance within at least a portion of the structure, and this resonance is detected by an acoustic receiver that is placed at or near the entrance to the structure. The signal from the acoustic receiver is provided to a spectrum analyzer and spectra associated with the received signal are generated. Resonance peaks within the spectra are analyzed to determine at least one of size and location of chambers or connecting segments within the structure and movement of objects within the structure.

In one embodiment, the present invention provides an apparatus for sensing characteristics of a structure. The apparatus comprises (a) an acoustic generator operable to generate acoustic waves directed into an entrance of the structure, the acoustic waves generating acoustic resonance within at least a portion of the structure, the acoustic resonance generating resonant acoustic waves; (b) an acoustic receiver operable to receive the resonant acoustic waves from the entrance of the structure; and (c) a control system operably interconnected to the acoustic generator and the acoustic receiver and operable to receive a signal from the acoustic receiver corresponding to the resonant acoustic waves and analyze the signal to determine at least a movement of an object within the portion of the structure associated with the acoustic resonance. In one embodiment, the acoustic generator includes a loudspeaker, a power amplifier operably interconnected with the loudspeaker and operable to drive the loudspeaker to generate the acoustic waves, and a frequency sweep generator operably interconnected to the power amplifier and operable to deliver a frequency varying signal to the amplifier. The acoustic generator may also include a sweep trigger operably interconnected to the frequency sweep generator and operable to control the frequency sweep generator to deliver the frequency varying signal. The sweep trigger controls a rate at which the frequency of the frequency varying signal is adjusted and a range of frequencies of the frequency varying signal. The range of frequencies, in an embodiment, is selected based on expected characteristics of the structure.

The acoustic receiver, in an embodiment, comprises a microphone and a preamplifier operably interconnected to the microphone. The acoustic receiver may also include a spectrum analyzer operably interconnected to the preamplifier and operable to generate a spectra of signals received at the microphone, and a structural characteristics estimator operably interconnected to the spectrum analyzer and operable to receive the spectra of signals from the spectrum analyzer and analyze the spectra to generate an estimation of the structural characteristics of the portion of the structure generating the resonant acoustic waves. The structural characteristics are estimated, in an embodiment, determining resonant peaks of the spectra, comparing the resonant peaks to predetermined resonant peaks associated with structures having known structural characteristics, and determining the structural characteristics based on the comparison. The determining of the structural characteristics may be performed using a least squares fit between the resonant peaks and the predetermined resonant peaks to generate an estimate of the structural characteristics.

In a further embodiment, the acoustic receiver further comprises a motion and direction detector operably interconnected to the spectrum analyzer and operable to receive a plurality of spectra from the spectrum analyzer and generate an estimation of motion of objects within the portion of the structure generating the resonant acoustic waves. The motion and direction detector is operable to compare successive spectra of the plurality of spectra and estimate movement based on a difference in resonant peaks between the successive spectra.

BRIEF DESCRIPTION OF THE DRAWINGS

The present invention can be more readily understood in conjunction with the accompanying drawings, in which.

DETAILED DESCRIPTION

The present invention provides a method and system for acoustic sensing of structures including a general shape or configuration of the structure and movement within the structure. As used herein, the term structure is used to refer to anything constructed or erected above or beneath the surface of the ground such as supports, shelters, and enclosures for use by persons, animals, goods or property of any kind. Also, as used herein, the term characteristics (or structural characteristics) is used to refer to physical properties of structures, such as size, shape, and layout of chambers and/or cavities therein, as well as movement and activity within a structure. Acoustic waves are generated and excite an acoustic resonance within the structure, and this acoustic resonance is received at an acoustic receiver. Acoustic resonance is caused by one or more reflections of an acoustic wave within a structure that often result in the intensification of acoustic waves at certain frequencies. The frequencies at which acoustic resonance occurs is a property of the size, shape, and layout of chambers within the structure, as well as the number and placement of objects within the chambers. The received signal is analyzed in comparison to the generated signal, and characteristics of the structure are determined, including the size and shape of the structure, as well as movement of objects within the structure. Furthermore, the method and system may be used in rescue operations to determine the existence of cavities or movement within collapsed structures, such as collapsed buildings or mines.

The present invention uses acoustic waves to characterize structures, including the activity within. As waves, such as sound waves, from an acoustical source travel into the structure, they resonate within cavities and connecting tunnels or halls. These resonances are the result of the same types of reflections that result in echoes in large caves or rooms. In one embodiment, the acoustic frequencies used are very low, near the threshold of hearing, and are termed infrasonic (i.e. less than about 20 hertz). At these low frequencies, the acoustic waves have a relatively long wavelength and may penetrate deep into a structure. For example, at 20 hertz the wavelength is approximately 18 meters (~55 feet). Rock, soil and walls are almost perfect reflectors (>99%) at these relatively low frequencies and the interior chambers resonate at frequencies where one or more wavelengths fit within the walls. A microphone, or other acoustic receiver, sensitive to this frequency range senses these resonances. The source frequency is swept over a frequency range sufficient to excite the natural resonances of the interior spaces. These measurements create a "resonance spectrum" of the structure over the swept frequency range.

Figure 1:
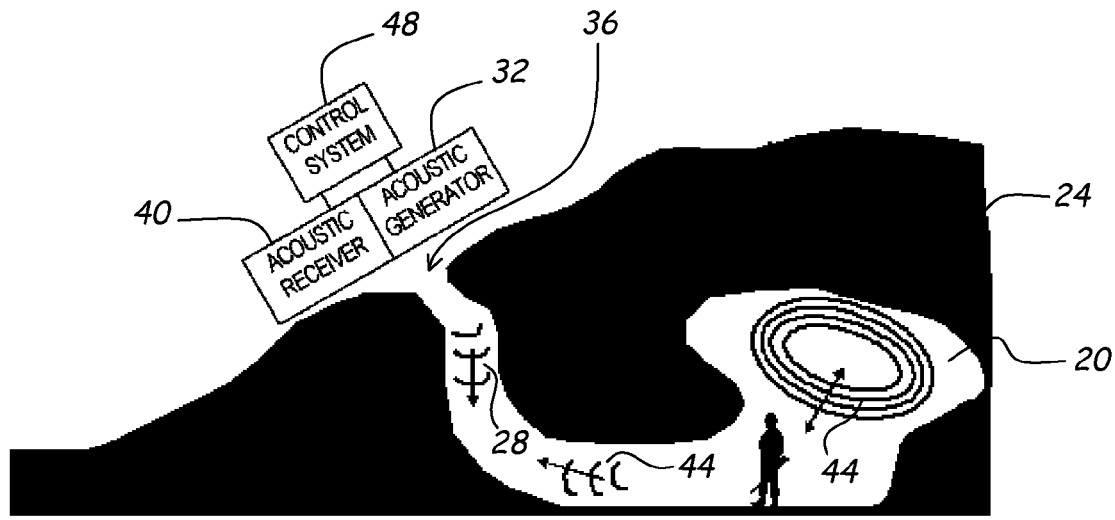
FIG. 1 is an illustration of an acoustic sensing system of an embodiment of the invention.

Referring to FIG. 1, a schematic illustration of a system of the present invention is now described. A structure 20, in this example is an underground facility having a chamber or cavity located within the earth 24. Acoustic waves 28 are generated from an acoustic generator 32, and these waves are emitted and resonate within the structure 20. The acoustic generator 32 may be deployed at an entrance 36 to the underground facility, or held by a user within the structure 20 itself. An acoustic receiver 40 senses the waves 44 that reflect and resonate within the structure 20. The received acoustic signals 44 are processed by a control system 48 to characterize the structure 20 and determine total volume and number of cavities, connecting segments, entrances, and moving entities within. As used herein, the term entrance refers to any part of a structure where acoustic waves may be transmitted into other parts of the structure. Such entrances include, for example, openings, windows, doors, and/or interior parts of the structure itself.

The system may be used in many embodiments, such as military applications to provide for improved safety of soldiers and guided vehicles deployed within underground structures to determine extent of underground structures, and whether entities, such as adversarial combatants, are approaching, including around blind corners. The layout and extent can be characterized in terms of total volume, number of entrances, number of large caverns, and moving entities within the structure. Characterization of underground facilities using both before and after readings may be used to provide an assessment of battle damage.

The use of acoustic signals provides several important characteristics. For example, rock and soil walls provide relatively little attenuation of acoustic signals, unlike electromagnetic radiation which is significantly attenuated by such material. Similarly, above-ground structures such as houses and steel or concrete buildings also provide relatively little attenuation of acoustic signals. Furthermore, acoustic waves may travel around corners to sense deep within the structure. The technology also has a low cost as compared with electromagnetic equipment, and is relatively small and may be embodied in a man-portable apparatus. Multiple configurations are available, including handheld, and air delivery into the entrance, vehicle-mounted, or standoff sensing. The frequency of the acoustic signals may also be selected to be below the hearing threshold of occupants of the structure, and may thus provide undetected sensing of the structure and movement therein.

The system may also be used in many embodiments involving non-military operations, such as law enforcement and emergency personnel attempting to locate people. As mentioned above, the system may be used to characterize and sense movement within non-military structures such as buildings, homes, tunnels and mines, as well as sensing the characteristics and any movement within collapsed structures for rescue operations.

Figure 2:
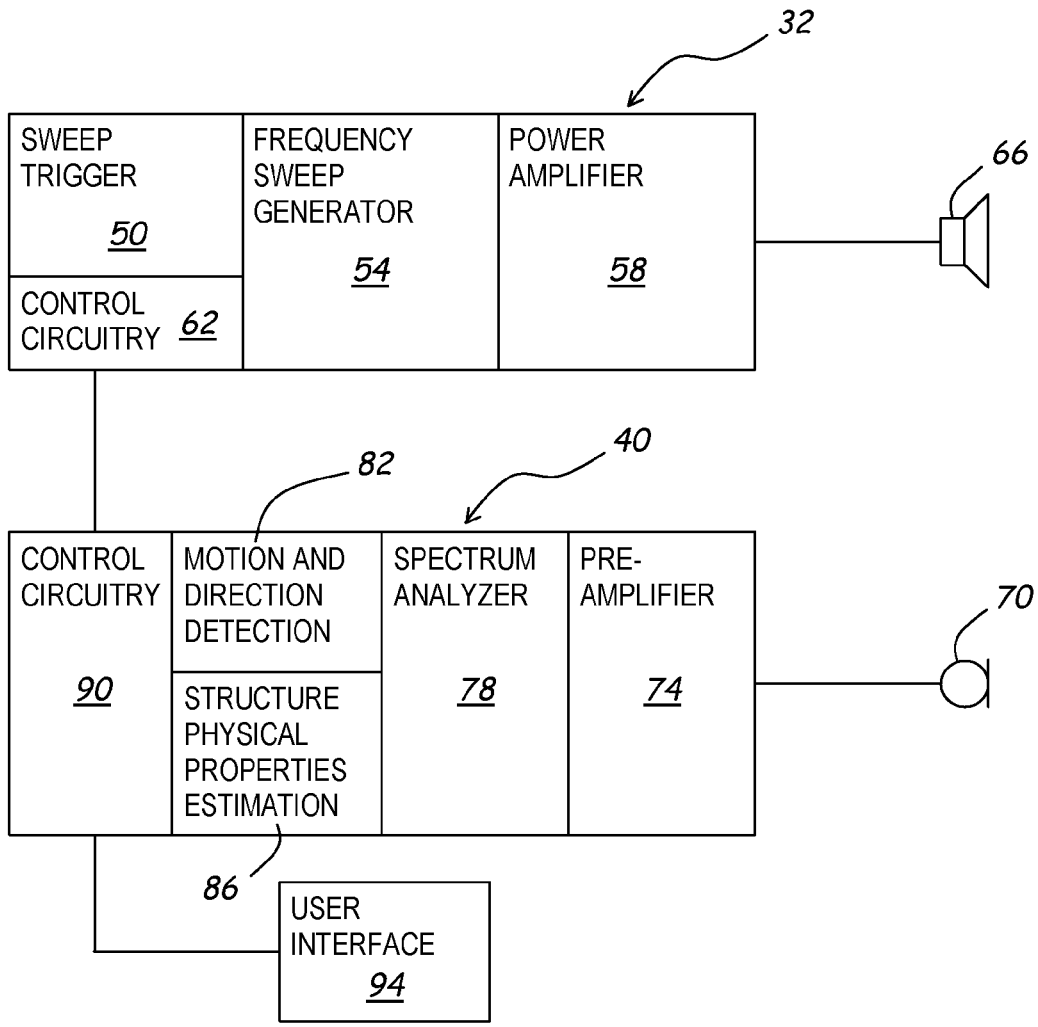
FIG. 2 is a block diagram illustration of an acoustic sensing system of an embodiment of the invention.

Having generally described the invention and applications thereof, a more detailed discussion of some embodiments of the invention are now presented with reference to FIGS. 2-11. FIG. 2 illustrates the electronics required to excite resonances, receive the reflected waves and analyze the spectrum of the received waves. Acoustic waves are generated by the acoustic generator 32 that includes, in this embodiment, a sweep trigger 50, a frequency sweep generator 54, a power amplifier 58, and control circuitry 62. The acoustic generator 32 is connected to a loudspeaker 66 that creates the acoustic waves. Acoustic waves are received at the acoustic receiver 40 that includes, in this embodiment, a microphone 70, a preamplifier, a spectrum analyzer 78, motion direction detection components 82, structure characteristics estimation components 86, and control circuitry 90. A user interface 94 provides a user with control capability and provides an output indicative of the structural layout and any motion detected within the structure.

Having generally described the components of the system, the operational steps for using the system are now described. First, a trigger signal is generated at the sweep trigger 50 to initiate a frequency sweep at some desired rate by the frequency sweep generator 54. The frequency is swept over a preset range needed to excite the resonances in the structure of interest. This range is based on prior knowledge of the sweep range required for similar structures under test (i.e. deep caves versus urban buildings). For example, typical underground structures large enough to contain human occupants will generally have many resonances in the range of about 0 Hz to about 200 Hz. Each of these resonances may be used to provide information about the characteristics of the structure including layout and activity therein. In addition, the sweep may be limited to infrasonic frequencies if there is a need for covert sensing. The frequency sweep electrical signal is then amplified at power amplifier 58 and used to drive the speaker 66 or other sound source. Although illustrated as a speaker or other electromechanical device, the sound source may be driven in alternate ways including, for example, pneumatic or electrostatic. In addition, alternate ways to excite a range of frequencies may be employed such as impulses, frequency chirps and other more time-limited sources. Furthermore, if advantageous for a particular application, alternate ways of directing the generated acoustic waves at the structure and focusing the energy can be employed.

The reflected waves returning from the structure interior are detected using the microphone 70 or other transduction device sensitive to the full frequency range of the excitation. The received signal is preamplified at the preamplifier 74 and sent to the spectrum analyzer 78 to obtain the response spectrum.

Analysis of the response spectrum is performed at the motion and direction detection components and the structure physical properties estimation components and provides information on the facility characteristics including number and lengths of connecting segments and chamber volumes. Personnel movement and other activity is sensed by comparing successive spectra to a baseline spectrum taken at an earlier time. In addition, the direction of motion and number of entities can be sensed from detailed analysis of the spectrum amplitude and phase near the resonance frequencies. The motion and direction detection components and the structure physical properties estimation components may include software and/or hardware components capable of receiving the response spectrum and performing the appropriate analysis, in comparison to the signal generated by the acoustic generator 32, to provide output to the user interface 94.

In one embodiment, the control circuitry 90 and 62 provide communications between the user interface 94, acoustic generator 32, and the acoustic receiver 40. The user interface 94 may include user controls to begin sensing operations, and an output, such as a video display, to provide information related to the structure to a user. In one embodiment, the output is displayed as a 2-dimensional or 3-dimensional map on a video screen that a user may analyze. The acoustic generator 32, acoustic receiver 40, and user interface 94 may be connected using any available technology for communication of information, including both wire connections and wireless connections. For example, the acoustic generator 32 and acoustic receiver 40 may be integrated as a single unit and placed at an entrance to or within a structure, and communicate with the user interface 94 through a radio connection. Furthermore, although illustrated in FIG. 2 as components of the acoustic receiver, it will be understood that the spectrum analyzer 78, motion and direction detection components 82, and structure physical properties estimation components 86 may be separate from the acoustic receiver 40. The acoustic receiver 40, in this case, would communicate the raw received acoustic signal to the spectrum analyzer 78 using one of any number of communication methods. Similarly, the entire system may be included in a handheld system that may be transported by personnel at the entrance to the structure, and while within the structure.

Figure 3:
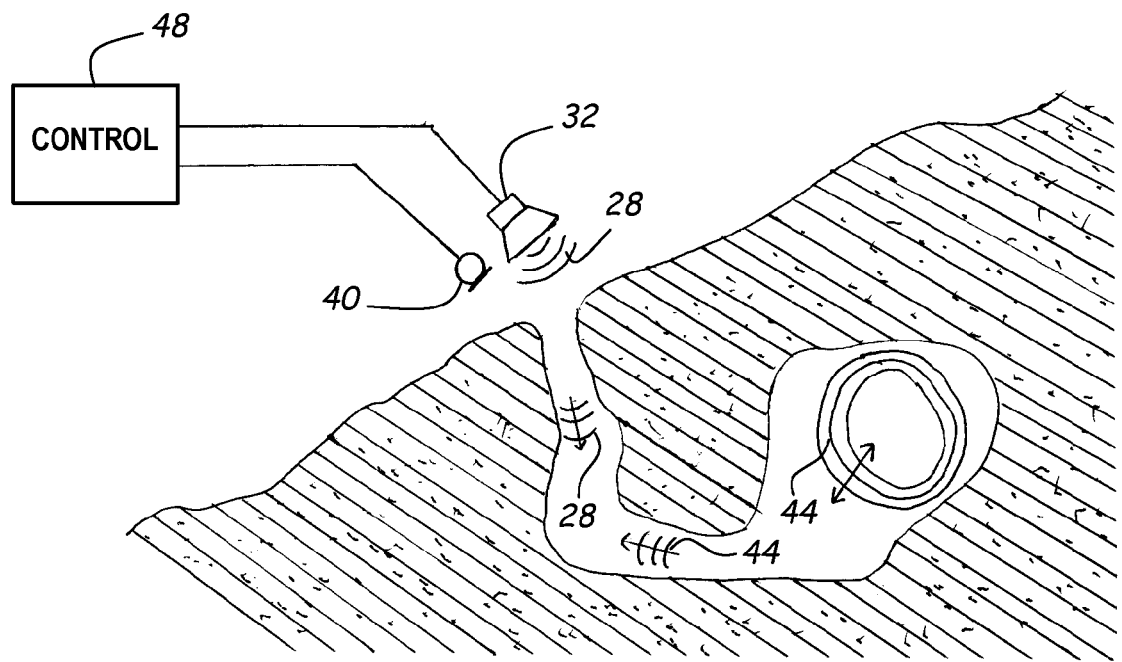
FIG. 3 is an illustration of an acoustic sensing system illustrating a cave application of an embodiment of the present invention.
Figure 4:
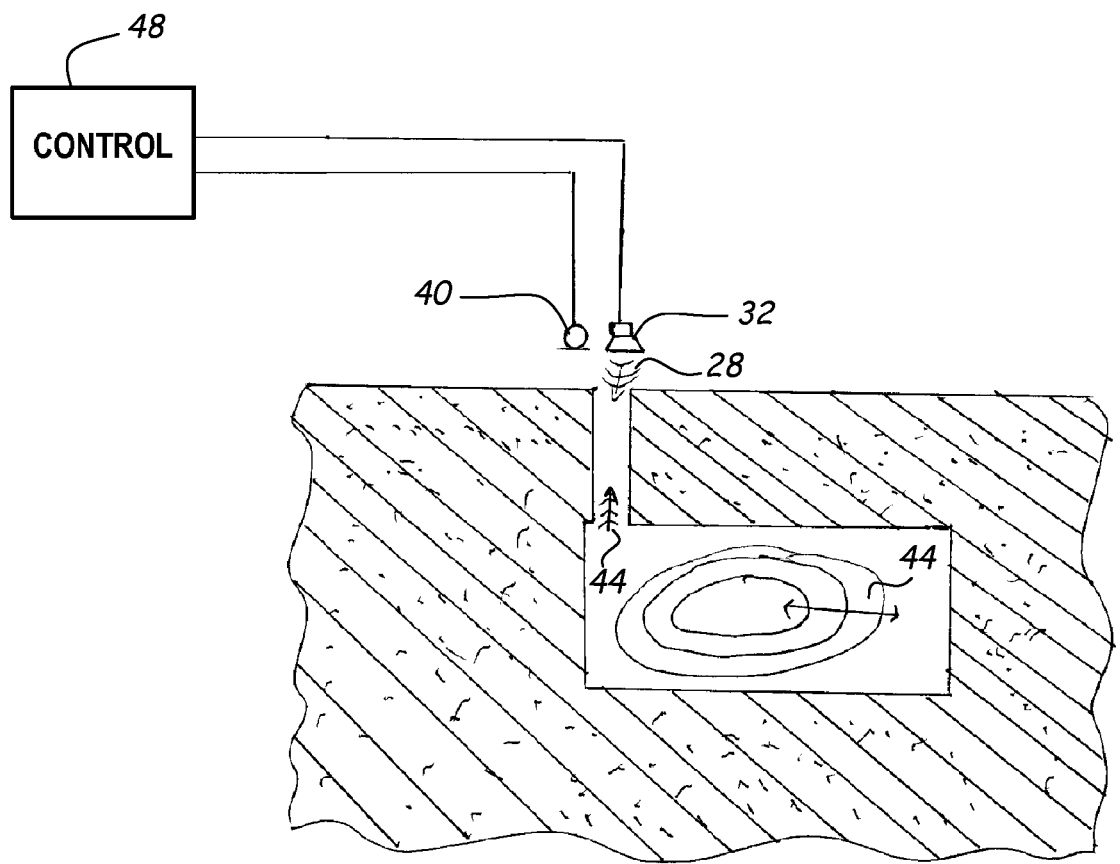
FIG. 4 is an illustration of an acoustic sensing system illustrating an underground bunker application of an embodiment of the present invention.
Figure 5:
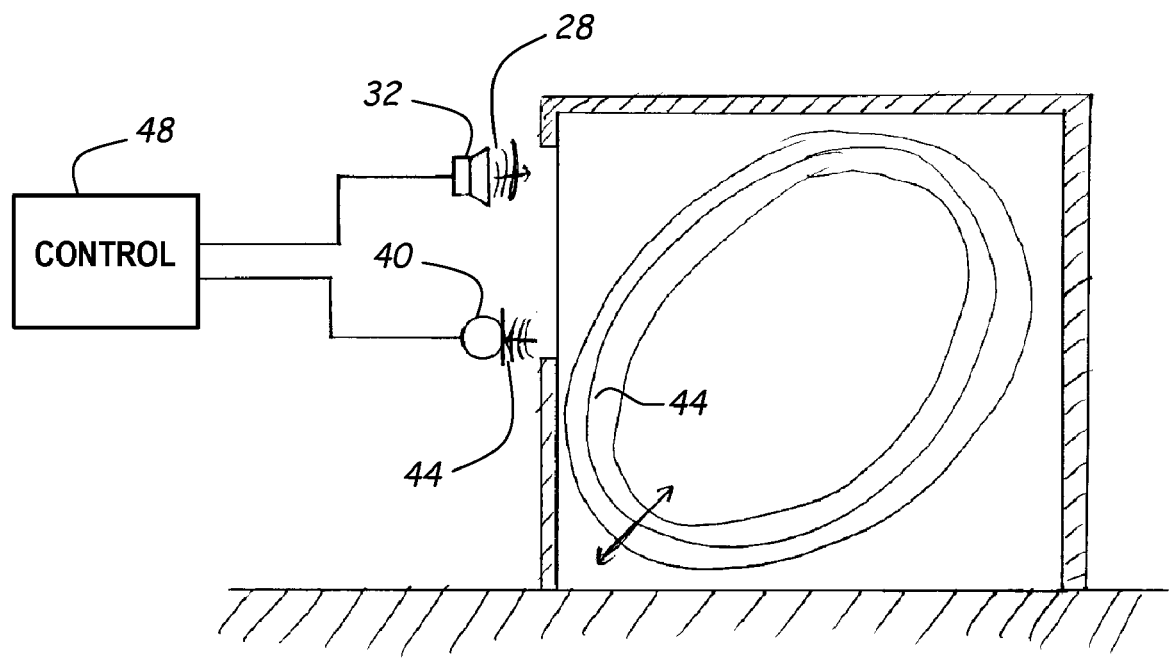
FIG. 5 is an illustration of an acoustic sensing system illustrating an aboveground structure application of an embodiment of the present invention.

Referring now to FIGS. 3-5, several embodiments of the system are illustrated with reference to different structures that may be analyzed. FIG. 3 illustrates a cave or tunnel having an associated cavity. FIG. 4 illustrates an underground bunker, and FIG. 5 illustrates a building or other above-ground structure. In each case, the control system 48 is connected to the acoustic generator 32 and acoustic receiver 40. Acoustic signals 28 enter the structure and excite a resonance signal 44 within the structure. The acoustic signals may enter the structure through areas of the structure that are relatively transparent, such as openings, windows, and open doors. The resonance signal 44 is received by the acoustic receiver 40 and analyzed by the control system 48.

As described above, the characteristics of a structure and motion therein are provided to a user. The motion and direction components 82, and the structure physical properties estimation components 86 receive the response spectrum and provide an output based on the analysis of the response spectrum. This output, in one embodiment, is based on acoustic models for the response spectrum produced by different types of structures. At low frequencies, well-established acoustic transmission line theory can be used to model the response of a structure's interior chambers and branches. Such transmission line theory is known, and described, for example, in the publication: Allen D. Pierce, Acoustics: An introduction to it's physical principles and applications, Chapter 7: Low frequency models of sound transmission, McGraw Hill, 1981.

Figure 6:
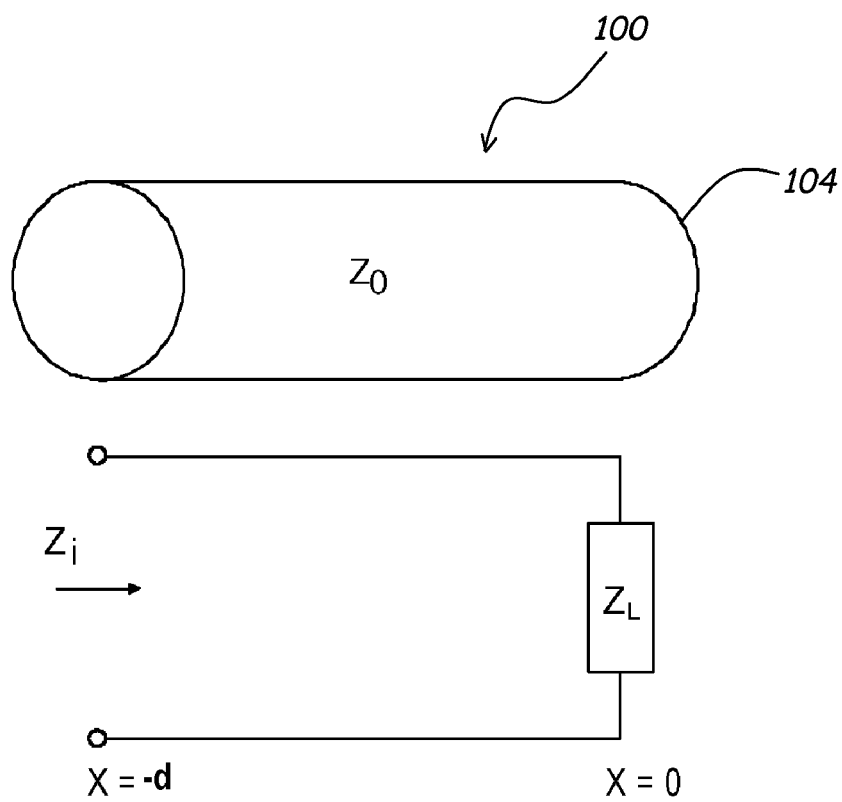
FIG. 6 is an illustration of an impedance model for a tube of an embodiment of the invention.

Referring now to FIG. 6, as an example, a transmission line model for a tube (or tunnel) 100 of length d with a closed-end 104 that is terminated with acoustic load impedance $Z_L$ is now described. The input impedance $Z_i$ looking into the tube at X=−d may be modeled according to one or more models of sound transmission that are known. Such a model is described, for example, in the publication: Kinsler, L. E. and Frey, A. R., Fundamentals of acoustics, John Wiley and Sons, Inc. New York, pp. 201, 1962. In one embodiment, the input impedance $Z_i$ is modeled as:

$$Z_i = Z_0 \left( \frac{Z_L + jZ_0 \tan kd}{Z_0 + jZ_L \tan kd} \right) \quad \text{Eq. 1}$$

Here $Z_0$ is the characteristic tube impedance $\rho_0 c/S$, where $\rho_0$ is the density, c is the sound speed and S is the cross sectional area of the tube. If the tube is terminated with a rigid cap (closed tunnel), $Z_L$ is infinite and $$Z_i = \frac{Z_0}{j \tan kd} \quad \text{Eq. 2}$$

Figure 7:
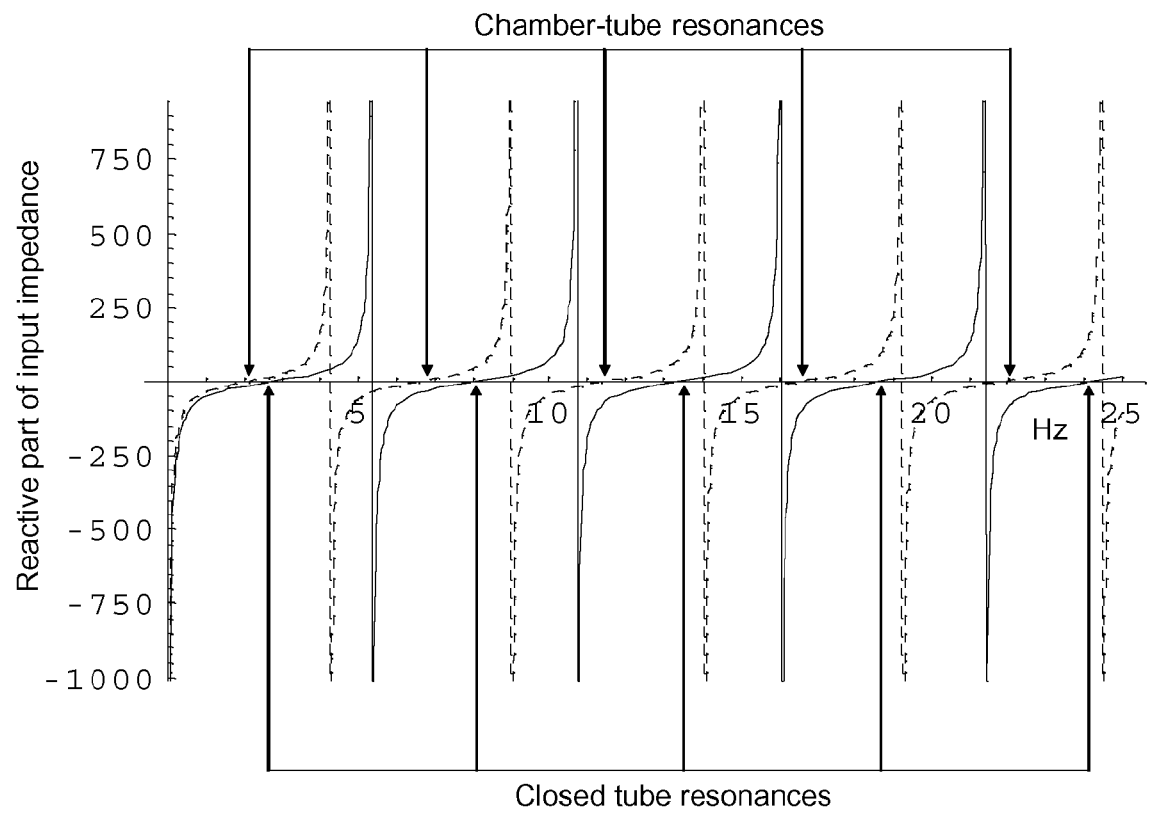
FIG. 7 shows an impedance graph for a tube terminated with a rigid cap (solid line) and a chamber (dashed line)

Tube resonances occur when the reactive part of the input impedance goes to zero. At this frequency, the power through the tube is a maximum for a constant driving pressure. An example of an impedance graph of the invention is illustrated in FIG. 7 for a 2 meter diameter tunnel in rock ending with a rock wall 32.4 meters from the entrance. The solid curve in FIG. 7 is a graph of the imaginary part of the input impedance for this structure. Note that there are five resonance peaks below 25 Hz, and the resonance frequencies are a fixed frequency apart (~5.25 Hz). The reflectance spectrum at the tunnel entrance will peak at these same resonances. The dashed curve of FIG. 7 illustrates how the resonance pattern changes if the same tunnel has a 5 meter square chamber at the end (125 m³ volume). With the chamber added, the resonance peaks shift to lower frequencies, and the peaks are no longer at fixed frequency separations. Thus, analysis of the resonance pattern provides information on the presence and size of the chamber. In one embodiment, the control portion of the system includes information on resonance patterns of known physical structures, and the received spectrum is compared to the known resonance patterns to determine an estimate of the physical properties, such as chamber configuration, size, and volume. This comparison and analysis and estimation is described in more detail below.

Figure 8:
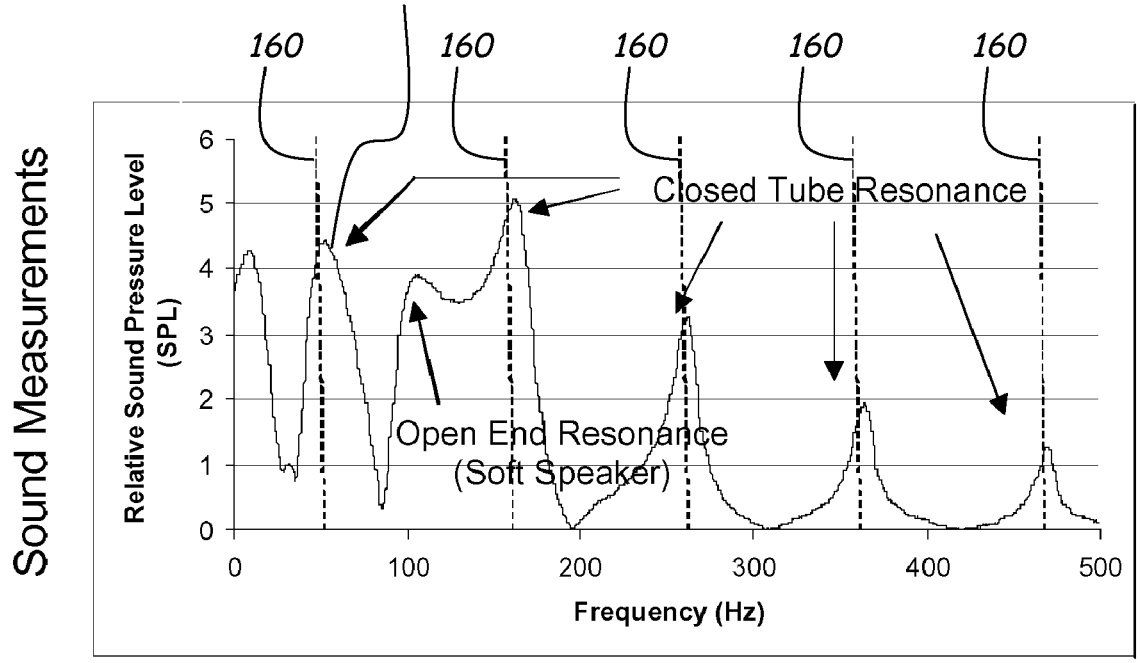
FIG. 8 is a plot of the measured resonance spectra from a scale model of a tunnel and comparison to predicted resonance frequencies.

Referring now to FIG. 8, resonance spectra for a scale model are illustrated. When operating using acoustic signals and resonant cavities, the model used to analyze the returned spectra scales with frequency. These low frequency models of tunnel resonances have been tested using scale models, with the response spectrum of one such model illustrated in FIG. 8. A 20:1 scale model of the above tunnel described in FIG. 7 comprises a 0.10 meter diameter, 1.62 meter long PVC pipe that is capped at one end and driven with a loudspeaker at the opposite end. A small microphone is located directly in front of the speaker. The scaled acoustic model has a similar response at 500 Hz as the 32.4 meter tunnel at 25 Hz. An illustration of the scale model measured spectrum is shown in FIG. 8. The dotted lines in this figure are drawn at the predicted frequencies of the tube of FIG. 7 times the scaling factor (20). As shown in the figure, the measured resonance frequencies of the scaled physical model 150 agree well with the predicted resonances of the full-scale tube 160. This demonstrates the accuracy and sensitivity of the transmission line models at low frequencies. At higher frequencies, the air absorbs the sound waves more strongly, and these dissipative effects weaken the resonances. The drop off in resonance amplitude at the higher frequencies of FIG. 8 is partly due to this absorption. Although the transmission line models generally do not include absorption of the waves at higher frequencies, the models still provide adequate estimates for the resonance frequencies that may be used when analyzing received spectra for a structure.

Figure 9A:
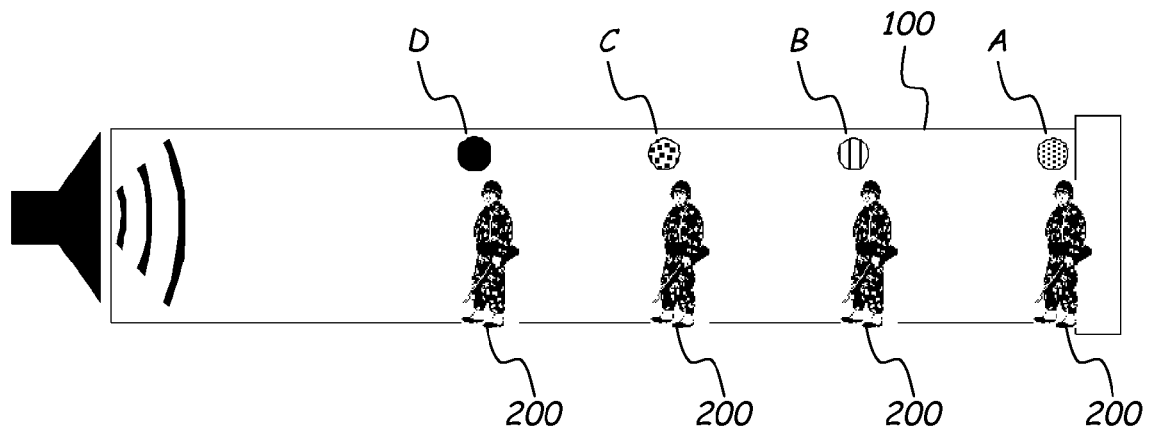
FIG. 9A illustrates a scale model tube with a model occupant located in various positions within the tube.
Figure 9B:
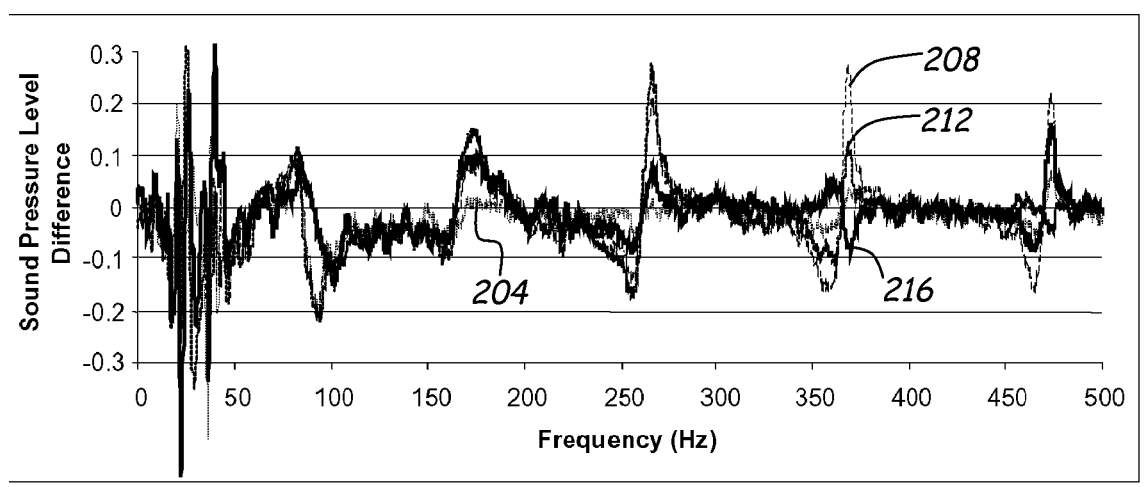
FIG. 9B shows a graph of the measured spectra for the tube of FIG. 9A with the model occupant moved to several positions within the scale model tube.

In an embodiment of the invention, personnel movement is sensed by comparing changes in the response spectrum over time as personnel move within a structure. To illustrate the analysis, FIG. 9B shows the difference in the response spectra for the same PVC tube described with respect to FIG. 8 with a model occupant located at several positions along the tube 100, illustrated in FIG. 9A. The model occupant 200 occupies approximately 10% of the tube cross-sectional area. The curve 204 shows the response when the model occupant 200 is located at the end of the tube 100, illustrated in FIG. 9A as position A. Curve 208 shows the response when the model occupant 200 is moved to a second position illustrated in FIG. 9A as position B. Curve 212 shows the response when the model occupant 200 is moved to a third position illustrated in FIG. 9A as position C. Finally, curve 216 shows the response when the model occupant 200 is moved to a fourth position illustrated in FIG. 9A as position D. At location A the presence of the occupant results in minimal difference at all frequencies compared to the spectrum for the tube having no occupant. However, as the model occupant 200 is moved closer to the entrance end of the tube 100, the spectrum is dramatically changed, especially at frequencies near resonance. Inspection of the spectral changes, including amplitude and phase, near resonance peaks may be used to determine both the size and position of the model occupant 200 relative to the entrance. For instance, the polarity changes between curve 212 and curve 216 at 360 Hz as the model occupant 200 crosses the center of the tube. These spectral details, in an embodiment, are extracted by the above-described motion and direction detection components and structure physical properties estimation components (FIG. 2) and used to determine the direction of movement of personnel within a structure.

Figure 10A:
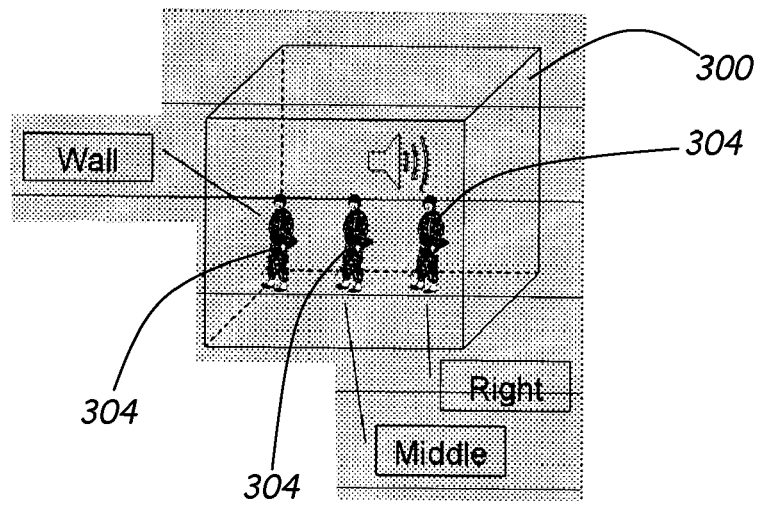
FIG. 10A is an illustration of a scale model box and a model occupant located at different positions within the box.
Figure 10B:
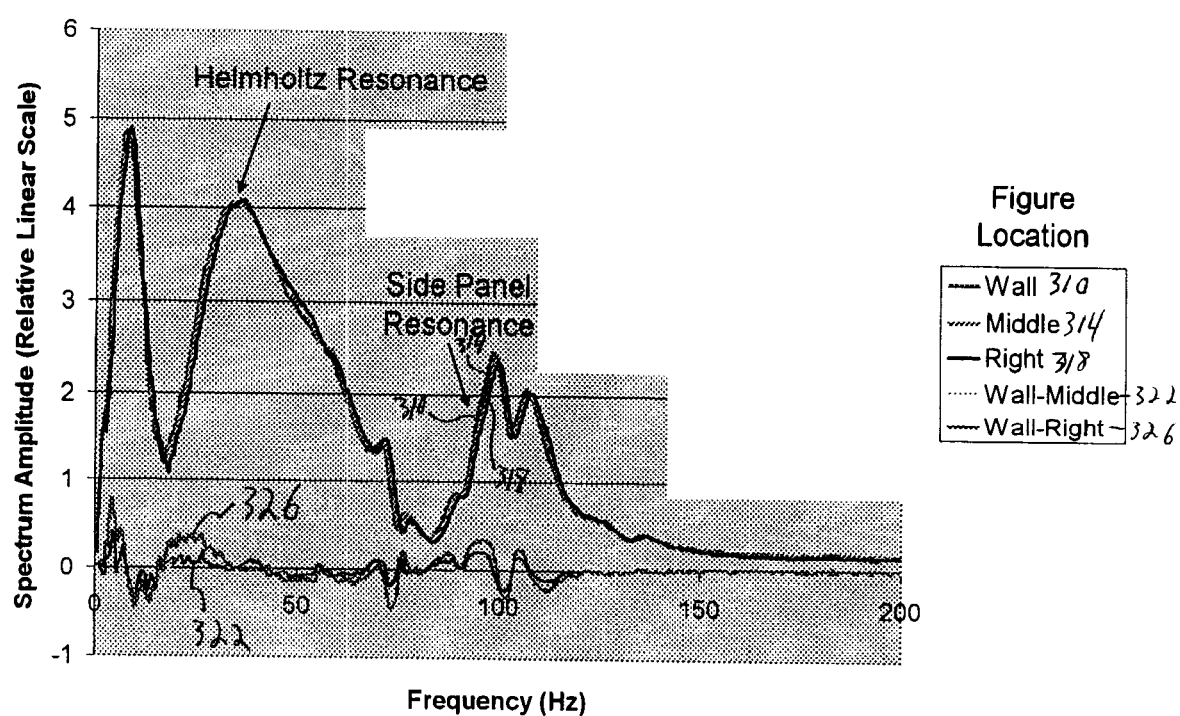
FIG. 10B shows measured resonance data for the model box of FIG. 10A with the model occupant at several locations within the box model.

Another embodiment of the invention provides activity detection of a person moving within a building. With reference to FIG. 10A, an illustration of a building 300, and occupant 304 are illustrated, with the occupant 304 having differing positions within the building 300. FIG. 10B shows measured resonance spectra for this model of an occupant moving within a building. The model of this example is a box with 0.61 meter square, 0.013 meter thick plywood walls. A model occupant and the model box are scaled to represent a person within a two-story building. The model occupant is approximately 1/500th the volume of the box interior. A loudspeaker and microphone are located at the upper right of the front wall panel of the model box, 0.15 meters from the edges. The model occupant is moved along a line on the floor of the box that is 0.46 meter from the front wall with the speaker. The spectra in FIG. 10B are measured for the model occupant located against the left wall (wall) 310, 1/3 of the distance across (middle) the box 314, and 2/3 of the distance across the box to the right wall (right) 318.

As may be observed from the spectra of FIG. 10B, the resonance at 35 Hz is a characteristic Helmholtz resonance of the box. The frequency of the resonance is determined by the volume of the box and the effective length of the loudspeaker mounting. The peaks near 100 Hz are caused by resonances of the side panels of the compliant plywood sides. Significant changes in both of these resonance peaks can be seen as the model occupant is moved within the structure. The differences between the spectra for the model occupant 304 against the wall and at two positions inside the box are also shown in the figure and marked "wall-middle" 322 and "wall-right" 326. These difference plots exhibit similar resonance changes on both sides of the peaks as those shown in FIG. 9B.

The measurements of the model building shown above in FIG. 10B demonstrate the sensitivity of the system to movement within a structure. The spectral differences caused by movement to a new location are approximately 10% of the amplitude of the spectra in FIG. 10B, even though the model occupant is only 0.2% of the volume of the structure. The high sensitivity is due to the effect of the small occupant on the high-slope sides of the resonance peaks. The slight shifts in frequency caused by the presence of the model occupant result in relatively large spectral differences.

The examples above show how to model simple tubes and chambers with transmission-line acoustic techniques. However, more complicated structures resembling tunnels, caves and buildings more likely to occur in the field are modeled, in one embodiment, by adding side branches to the main structure. If additional tunnels and chambers branch from the main tunnel, these structures result in resonance peaks at additional frequencies that may be distinguished from the original peaks. Thus analysis of the resonance spectrum provides detailed information on the chambers and connecting segments inside a structure.

Figure 11:
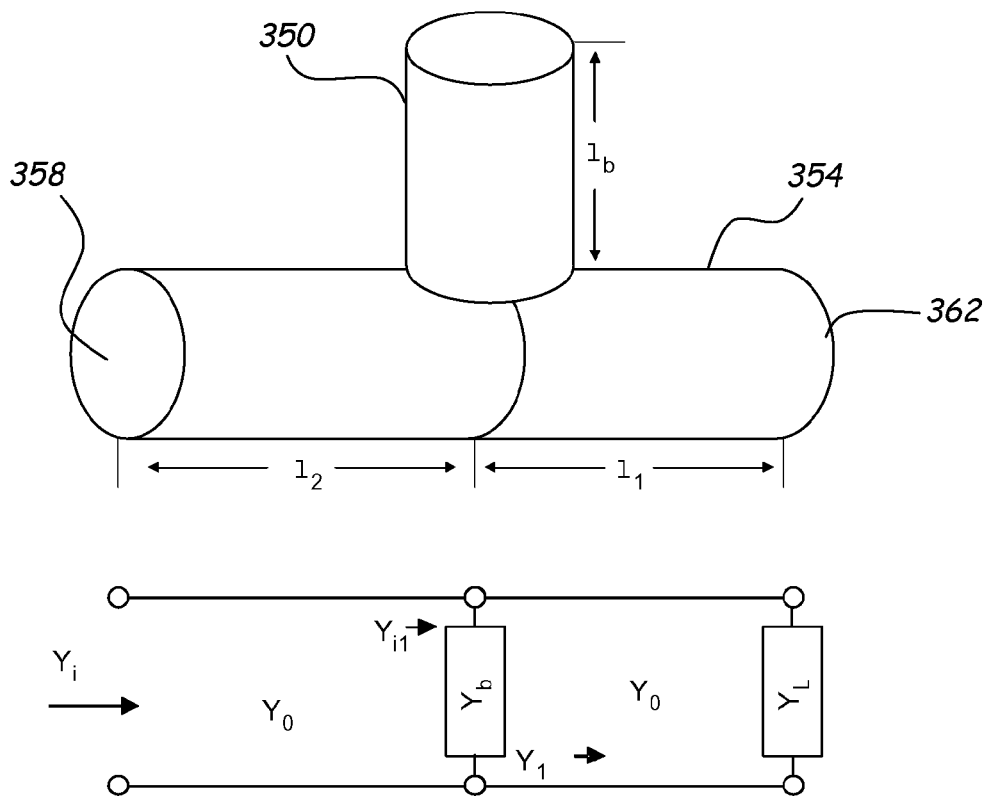
FIG. 11 is a transmission line model for a tube (tunnel) with a side branch.

As an example of a side branch, a separate, closed tunnel can be added to the side of the simple tunnel model already described. As illustrated in FIG. 11, side branches 350 to the main tube 354 in the model of this embodiment add in parallel. In this case, it is convenient to write the transmission line equations for side branches 350 and the main branch 354 as admittances (Y=1/Z) rather than impedances. In terms of admittances, Equation 1 becomes:

$$Y_1 = Y_0 \left( \frac{Y_L + jY_0 \tan kl_1}{Y_0 + jY_L \tan kl_1} \right) \qquad \text{Eq. 3}$$

This is the acoustic admittance looking to the right into the main tube section 354. Because the admittances of this main section 354 and the side branch 350 add in parallel, the admittance looking into the first side branch is a simple addition $$Y_{i1} = Y_1 + Y_b \qquad \text{Eq. 4}$$

where $Y_b$ is the admittance of the side branch 350 seen at the connection to the main tube 354. This $Y_{i1}$ is the new load admittance seen at the input end of the tube 358 at distance $l_1$ from the tube end 362. Thus, similar to equation 3, the input admittance $Y_i$ at the entrance of the structure is $$Y_i = Y_0 \left( \frac{Y_{i1} + jY_0 \tan kl_2}{Y_0 + jY_{i1} \tan kl_2} \right) \qquad \text{Eq. 5}$$

Figure 12:
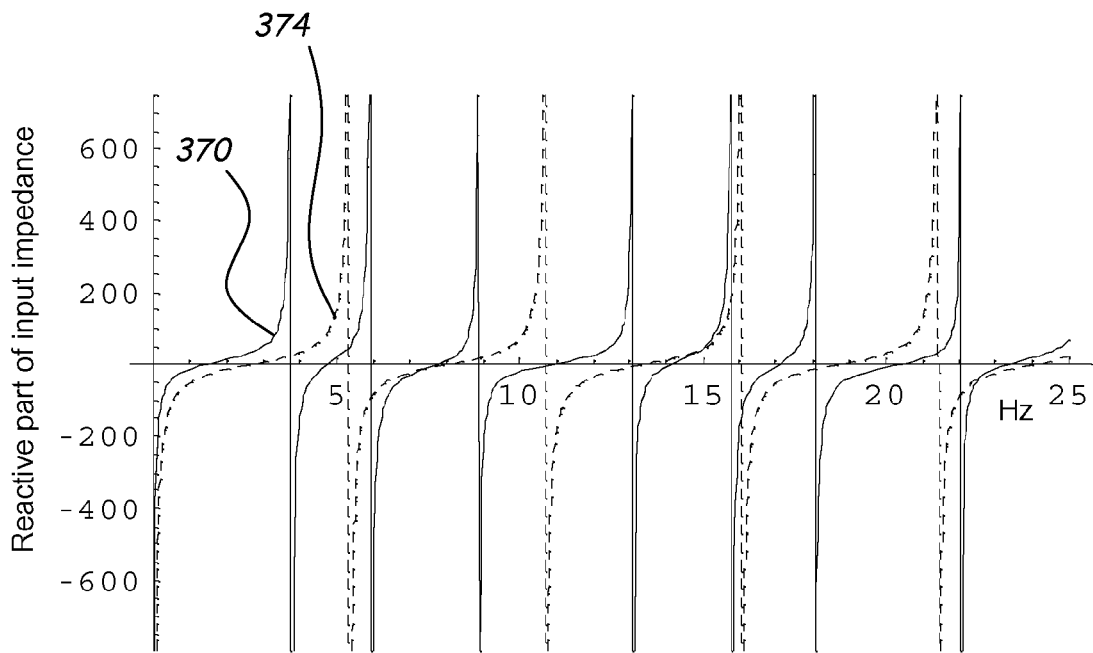
FIG. 12 shows an impedance graph for a rigid-end tube with (solid) and without (dashed) a side branch in the middle.

An illustration of resonance frequencies for the example of FIG. 11 is illustrated in FIG. 12 for the same main tube length as in FIG. 6 (32.4 meters). The side branch 350 for this example is 2.84 meters in diameter and 23.14 meters long. As illustrated in FIG. 12, the resonances of the tube with a side branch of FIG. 11 are indicated by the solid curve 370, and the resonances from the tube 100 of FIG. 6 are indicated by the dashed curve 374 for the purposes of comparison. As may be readily observed from FIG. 12, the resonances (zeros of the $Y_i$ curves 370) are no longer uniformly spaced in frequency as for the single tube (indicated by curve 374). With the addition of the side branch, the resonance frequencies now occur at unique frequencies characteristic of the length and size of the main tube and side branch. These unique, and non-uniformly spaced resonance frequencies may be modeled and used in determining an estimation of the size and shape of unknown tubes or tunnels.

As demonstrated above, embodiments of the invention may use the resonance spectrum to uniquely determine the connectivity, lengths and diameters of tubes and box-like structures. Additionally, many "inverse" methods are known in the art that can provide values for these parameters of a structure based on measurements of the resonance spectrum. Other embodiments of the invention use such inverse methods. Examples include the Levinson-Durbin algorithm for system ID, linear least-squares parameter estimation, and the Levenberg-Marquardt algorithm for nonlinear estimation (described in publication: D. Marquardt, "An algorithm for least-squares estimation of nonlinear parameters," SIAM J. Appl. Math., Vol. 11, pp. 431-441, 1963).

Another embodiment of the invention uses a modeling method similar to an inverse-method that uses reflected acoustic waves to estimate the changes in vocal tract (tube) area beyond the human mouth. Such a model is described in the publication: Schroeder, M. R. "Determination of the geometry of the human vocal tract by acoustic measurements," J.Acoust.Soc.Am, 41(4), pp. 1002-1010, 1967. For this inversion method, the area function for the tract is obtained from measurements of the admittance function at the mouth, once certain constraints are placed on this function. The acoustic measurements are matched to a simplified transfer function for the vocal tract using a least-squares match criterion. The vocal tract-area function is then computed using an iterative procedure. In a similar manner, the present invention computes structural characteristics using acoustic signals.

While the invention has been particularly shown and described with reference to a preferred embodiment thereof, it will be understood by those skilled in the art that various other changes in the form and details may be made without departing from the spirit and scope of the invention.

What is claimed is:

1. An apparatus for sensing characteristics associated with a structure, comprising:
   an acoustic generator operable to generate acoustic waves directed into an entrance of the structure, said acoustic waves generating acoustic resonance within at least a portion of the structure, said acoustic resonance generating resonance acoustic waves;
   an acoustic receiver operable to receive said resonance acoustic waves from the entrance of the structure; and
   a control system operably interconnected to said acoustic generator and said acoustic receiver and operable to receive a signal from said acoustic receiver corresponding to said resonance acoustic waves and analyze said signal to determine at least one of direction and position of an object that is moving within the portion of the structure associated with said acoustic resonance.

2. The apparatus for sensing characteristics associated with a structure, as claimed in claim 1, wherein said acoustic generator comprises:
   a loudspeaker;
   a power amplifier operably interconnected with said loudspeaker and operable to drive said loudspeaker to generate said acoustic waves; and
   a frequency sweep generator operably interconnected to said power amplifier and operable to deliver a frequency varying signal to said amplifier.

3. The apparatus for sensing characteristics associated with a structure, as claimed in claim 2, wherein said acoustic generator further comprises:
   a sweep trigger operably interconnected to said frequency sweep generator and operable to control said frequency sweep generator to deliver said frequency varying signal, wherein said sweep trigger controls a rate at which the frequency of said frequency varying signal is adjusted.

4. The apparatus for sensing characteristics associated with a structure, as claimed in claim 2, wherein said acoustic generator further comprises:
   a sweep trigger operably interconnected to said frequency sweep generator and operable to control said frequency sweep generator to deliver said frequency varying signal, wherein said sweep trigger controls a range of frequencies at which the frequency of said frequency varying signal is adjusted.

5. The apparatus for sensing characteristics associated with a structure, as claimed in claim 4, wherein said range of frequencies is selected based on expected characteristics of the structure.

6. The apparatus for sensing characteristics associated with a structure, as claimed in claim 1, wherein said acoustic receiver comprises:
   a microphone; and
   a preamplifier operably interconnected to said microphone.

7. An apparatus for sensing characteristics associated with a structure, comprising:
   an acoustic generator operable to generate acoustic waves directed into an entrance of the structure, said acoustic waves generating acoustic resonance within at least a portion of the structure, said acoustic resonance generating resonance acoustic waves;
   an acoustic receiver operable to receive said resonance acoustic waves from the entrance of the structure; and
   a control system operably interconnected to said acoustic generator and said acoustic receiver and operable to receive a signal from said acoustic receiver corresponding to said resonance acoustic waves and analyze said signal to determine at least a movement of an object within the portion of the structure associated with said acoustic resonance;
   wherein said acoustic receiver comprises:
      a microphone;
      a preamplifier operably interconnected to said microphone;
      a spectrum analyzer operably interconnected to said preamilifier and operable to generate a spectra of signals received at said microphone; and
      a structural characteristics estimator operably interconnected to said spectrum analyzer and operable to receive said spectra of signals from said spectrum analyzer and analyze said spectra to generate an estimation of the structural characteristics of the portion of the structure generating said resonance acoustic waves.

8. An apparatus for sensing characteristics of a structure, comprising:
   an acoustic generator operable to generate acoustic waves directed into an entrance of the structure, said acoustic waves generating acoustic resonance within at least a portion of the structure, said acoustic resonance generating resonance acoustic waves;
   an acoustic receiver operable to receive said resonance acoustic waves from the entrance of the structure; and
   a control system operably interconnected to said acoustic generator and said acoustic receiver and operable to receive a signal from said acoustic receiver corresponding to said resonance acoustic waves and analyze said signal to determine at least one of a dimension and location of connecting chambers and/or connecting segments within the portion of the structure associated with said acoustic resonance.

9. An apparatus for sensing characteristics of a structure, comprising:
   an acoustic generator operable to generate acoustic waves directed into an entrance of the structure, said acoustic waves generating acoustic resonance within at least a portion of the structure, said acoustic resonance generating resonance acoustic waves;
   an acoustic receiver operable to receive said resonance acoustic waves from the entrance of the structure; and
   a control system operably interconnected to said acoustic generator and said acoustic receiver and operable to receive a signal from said acoustic receiver corresponding to said resonance acoustic waves and analyze said signal to determine at least one of a size and location of connecting chambers and/or connecting segments within the portion of the structure associated with said acoustic resonance;
   wherein said control system comprises a structural characteristics estimator operable to determine resonance peaks of said resonance acoustic waves and compare said resonance peaks to predetermined resonance peaks of known structural characteristics and determine said structural characteristics based on said comparison.

10. The apparatus for sensing characteristics of a structure, as claimed in claim 9, wherein said structural characteristics estimator is operable to perform a least squares fit between said resonance peaks and said predetermined resonance peaks and generate an estimate of said structural characteristics.

11. An apparatus for sensing characteristics of a structure, comprising:
an acoustic generator operable to generate acoustic waves directed into an entrance of the structure, said acoustic waves generating acoustic resonance within at least a portion of the structure, said acoustic resonance generating resonance acoustic waves;
an acoustic receiver operable to receive said resonance acoustic waves from the entrance of the structure; and
a control system operably interconnected to said acoustic generator and said acoustic receiver and operable to receive a signal from said acoustic receiver corresponding to said resonance acoustic waves and analyze said signal to determine at least one of a size and location of connecting chambers and/or connecting segments within the portion of the structure associated with said acoustic resonance;
wherein said acoustic receiver comprises:
a microphone;
a preamplifier operably interconnected to said microphone.
a spectrum analyzer operably interconnected to said preamilifier and operable to generate a spectra of signals received at said microphone; and
a motion and direction detector operably interconnected with said spectrum analyzer and operable to receive a plurality of spectra from said spectrum analyzer and generate an estimation of motion of objects within the portion of the structure generating the resonance acoustic waves.

12. The apparatus for sensing characteristics of a structure, as claimed in claim 11, wherein said motion and direction detector is operable to compare successive spectra of said plurality of spectra and estimate movement based on a difference in resonance peaks between the successive spectra.

13. A method of sensing activity within a structure, comprising:
sending acoustic waves into an interior portion of the structure;
measuring acoustic waves returning as reflections from walls and objects within the interior portion of the structure;
calculating a frequency spectrum of the acoustic waves returned from the structure interior; and
deriving from resonance peaks of said frequency spectrum a measure of the activity within the structure.

14. The method of claim 13, wherein said deriving step comprises:
receiving at least two successive frequency spectra; and
comparing successive spectra of said at least two successive frequency spectra; and
estimating activity based on a difference in resonance peaks between the successive spectra.

15. The method of claim 13, further comprising:
estimating structural characteristics of the structure based on said frequency spectrum.

16. The method of claim 15, wherein said structural characteristics comprise at least one of a size and location of chambers and/or connecting segments within the interior space.

17. A method of determining characteristics associated with a structure, comprising:
sending acoustic waves into an interior space of the structure;
measuring acoustic waves returning as reflections from walls and objects within the interior space;
calculating a frequency spectrum of the acoustic waves returned from the interior space; and
deriving from resonance peaks of said spectrum an estimate of at least one of a size and location of chambers and/or connecting segments within the interior space.

18. The method of claim 17, wherein said deriving step comprises:
determining resonance peaks of said spectrum;
comparing said resonance peaks to predetermined resonance peaks associated with structures having known structural characteristics; and
determining said structural characteristics based on said comparison.

19. The method of claim 18, wherein said determining said structural characteristics comprises:
performing a least squares fit between said resonance peaks and said predetermined resonance peaks and generating an estimate of said structural characteristics.

20. The method of claim 17, further comprising:
secondly deriving from said frequency spectrum a measure of activity within the interior space.

21. The method of claim 20, wherein said secondly deriving step comprises:
receiving at least two successive frequency spectra; and
comparing successive spectra of said at least two successive frequency spectra; and
estimating activity based on a difference in resonance peaks between the successive spectra.

* * * * *